United States Patent [19]

Dienes

[11] Patent Number: 4,685,981

[45] Date of Patent: Aug. 11, 1987

[54] METHOD AND APPARATUS FOR PROVIDING A SPACER TO A CABLE SPLICE

[75] Inventor: Zoltan B. Dienes, Annandale, N.J.

[73] Assignee: Thomas & Betts Corporation, Raritan, N.J.

[21] Appl. No.: 729,315

[22] Filed: May 1, 1985

[51] Int. Cl.[4] ............................................. H01B 13/22
[52] U.S. Cl. ........................................ 156/48; 156/49; 156/53; 428/135; 428/137; 428/317.3
[58] Field of Search ............................. 156/48, 49, 53; 428/135, 137, 317.3

[56] References Cited

U.S. PATENT DOCUMENTS

| | | | |
|---|---|---|---|
| 2,967,795 | 1/1961 | Bollmeier et al. | |
| 3,203,544 | 8/1965 | Gilbert | 156/49 X |
| 3,619,481 | 11/1971 | Smith | 174/139 F |
| 4,025,717 | 5/1977 | Whittingham | 174/88 |
| 4,257,630 | 3/1981 | Bartell et al. | 285/21 |

OTHER PUBLICATIONS

Buried Splice Closure System—Raychem Corporation, updated brochure.

*Primary Examiner*—Robert A. Dawson
*Attorney, Agent, or Firm*—Robert M. Rodrick; Salvatore J. Abbruzzese

[57] ABSTRACT

A method and apparatus for providing a sealed cable splice area is disclosed. The cable splice area is wrapped with an open cell spacer web. An adhesively coated liner is separately wrapped around the cable and the spacer web to form a pocket around the splice area. The pocket is filled with a cable encapsulating material which flows completely around the electrical conductors of the splice area. The filled pocket is then sealably wrapped to seal the cable splice area.

8 Claims, 6 Drawing Figures

FIG. 1
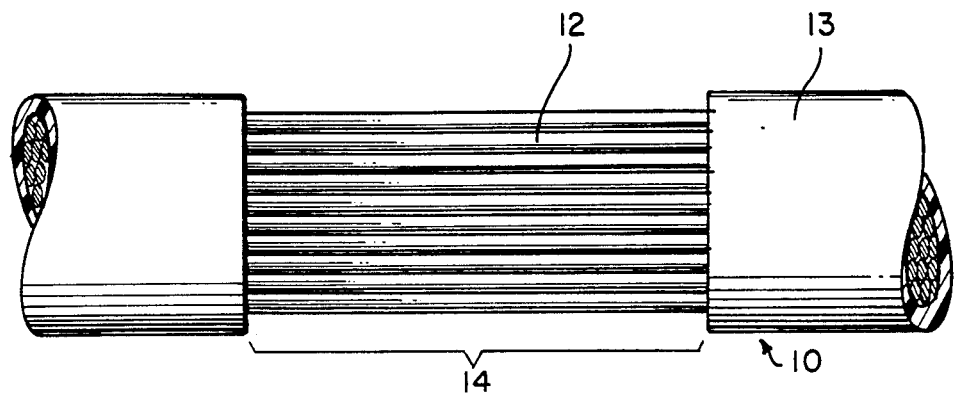
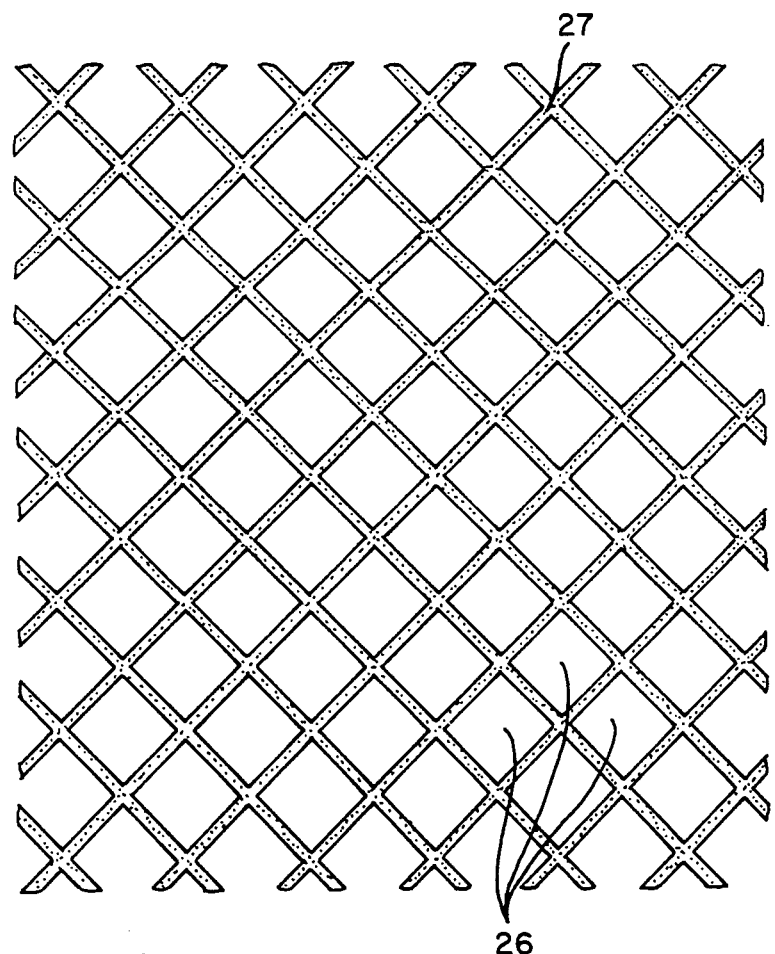
FIG. 2

METHOD AND APPARATUS FOR PROVIDING A SPACER TO A CABLE SPLICE

FIELD OF THE INVENTION

This invention relates generally to a method and apparatus for applying a spacer across a cable splice and more particularly to a method and apparatus for providing for the efficient flow of encapsulating material around the splice area of an electric cable.

BACKGROUND OF THE INVENTION

Telecommunication system cables normally employed in transmitting signals include many small diametered insulated wires surrounded in an outer jacket. These cables are used both indoors and outdoors and can be suspended horizontally or vertically. When used outdoors the cables may even be buried underground. Thus, the cable must be sealed against moisture and other environmental hazards. Often due to line failure or routine maintenance one or more wires must joined or spliced together. This necessitates violating the integrity of the cable to make such repair or splice. After entering the cable the exposed cable splice is resealed. Typically, these resealing techniques include wrapping a liner around the cable and pouring an encapsulating material around the spliced conductors to provide a moisture barrier therearound. The entire cable splice is then wrapped or covered, thereby providing an outer protective jacket. Effective sealing in this matter provides protection from adverse enviromental hazards that are present in areas where the cable is used. It is apparent that in order to provide such complete moisture seal it becomes necessary to insure that the encapsulating material completely surrounds the spliced conductors of the cable. Methods known in the art to seal cable splices typically include placing a liner around the cable splice and leaving a portion thereof open to accept the encapsulating material, which is usually provided in a viscous form. The encapsulating material is poured into the pocket formed by the liner and flows into and around the spliced conductors. However, since the liner is adhesively coated on the inside surface, the liner may adhere to the underside of the cable conductors and thereby prevent complete flowing of the viscous encapsulating material around the conductors. In order to prevent the liner from directly adhering to the under surface of the cable conductors, a web spacer may be employed directly on the adhesive liner to prevent direct adhesion of the liner to the under surface of the cable conductors.

While this method alleviates the problem of the liner adhering directly to the under surface of the cable conductors to some extent, it does not fully provide for the free flow of the viscous encapsulating material completely around the cable conductors as the cellular webbing, itself, adheres directly to the liner and when placed in close proximity to the cable conductors and impedes the flow of the encapulating material therearound.

Another approach is to use a non-adhesive liner with a webbing supported thereon. However, it is apparent that installation of this device is difficult in that the liner is not self-supporting around the cable splice. Further, liners and webbing combination of this type are usually provided in fixed lengths and width, thereby not accommodating a wide range of applications. A liner and webbing construction so described, is that sold as part of the splice closure system sold by Raychem Corporation, of Menlo Park, Calif., under the tradename XAGA 1600.

A further device known in the art used as a spacer between the cable conductors and the adhesively coated liner is an elongate relatively rigid plastic sheet having a plurality of openings therethrough. The plastic sheet is formed to have a series of undulations therealong which spaces the adhesive liner wrapped therearound from the conductors of the cable splice. However, in order to employ the undulated profile this spacer must be substantially rigid preventing any degree of flexability in the longitudinal direction of the cable. Thus, once fully enclosed the cable splice area will be substantially rigid having little flexability. It is, therefore, desirous to provide a spacer web which can be separately supported on the cable splice area apart from the liner. The spacer web should permit flexing of the cable in its longitudinal direction.

SUMMARY OF THE INVENTION

It is an object of the present invention to provide an effective, economical and simple method and apparatus for applying a spacer web to a cable splice.

It is a further object to provide a method and apparatus for sealably closing a cable splice which can be easily field installed using no special equipment or tools. The invention would permit the acceptance of encapsulating material around the cable splice assuring complete flow of encapsulating material around the conductors of the splice.

In the efficient attainment of these and other objects. The present invention contemplates a method and apparatus for sealing a splice area of an electrical cable. The methods includes the steps of wrapping an open cell spacer web around the cable splice area; wrapping an adhesively coated liner around the cable splice and the web to form an open ended pocket; filling the pocket with cable encapsulating material whereby the cable and encapsulating material completely surround the conductors in the cable splice area and sealably wrapping the filled pocket.

The apparatus comprises a cable splice web having a generally planar construction, including a patterned array of openings therethrough. Once wrapped around the cable spliced area the cable web serves to hold the adhesive liner away from the conductors of the splice to permit encapsulating material to flow completely around the conductors thereby providing a complete seal.

Other objects and features of the invention will be evident from the following detailed description of the preferred embodiment.

BRIEF DESCRIPTION OF THE DRAWINGS

FIG. 1 is a side elevational view of a portion of an electrical cable having an exposed central area which reveals the conductors shown extending therethrough.

FIG. 2 is a perspective showing of a cable splice spacer web of the present invention.

DETAILED DESCRIPTION OF THE PREFERRED EMBODIMENT

Figure 3:
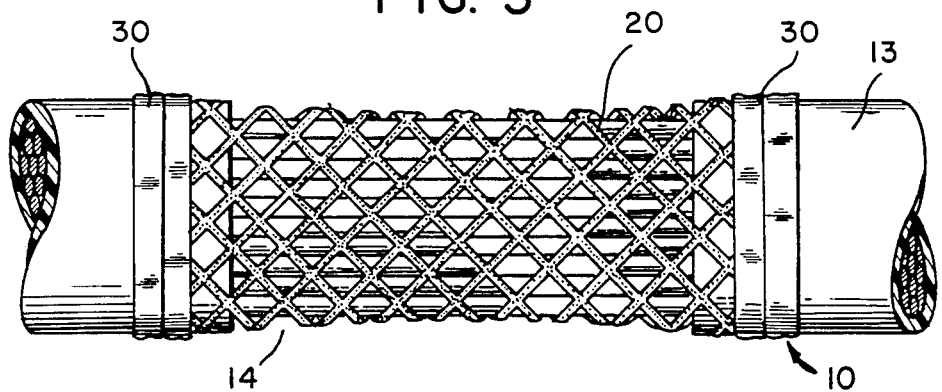
FIG. 3 is a view of the cable of FIG. 1 showing the cable splice spacer web wrapped around the splice area.

Referring the FIG. 1 there is shown an extent of electrical cable 10 which includes a plurality of conductors 12 extending therethrough. Conductors 12, which are of conventional construction, are shown schematically. A portion of cable 10 is typically broken away to create an exposed area 14 for maintenance, repair or splice purposes, which are performed in a manner known in the art. This exposed area is created by cutting away a portion of cable jacket 13 to form such exposed area 14. Hereinthroughout the terms "exposed area" and "cable splice" will be used interchangeably to describe the area of the cable which is to be resealed. In many applications it is not uncommon for the length of the exposed area 14 to be between 6 and 60 inches. Therefore, any method used to reseal this exposed area should be readily adaptable to extended lengths.

Turning now to FIG. 2, a cable splice spacer web 20 of the present invention is shown. Web 20 is a substantially planar member having opposed major surfaces 22 and 24 (not shown). Web 20 may be formed of any suitable and readily pliable material, such as plastic and more specifically ethylene vinyl acetate. The web has a generally mesh-like or cellular appearance defining a patterned array of openings 26 through and between major surfaces 22 and 24. As used herein the term mesh-like refers to the particular construction of the web 20 where the open spaces defined by openings 26 occupy a substantial majority of the planar surface area of web 20. As will be described in greater detail hereinbelow, openings 26 permit the free flow of viscous encapsulating material therethrough. In order to facilitate adhesion of the cable spacer web 20 to splice area 14 the cable spacer web may be adhesively coated with a commercially available adhesive 27. Adhesive 27 is typically placed on web 20 by dipping the web in an adhesive bath. The adhesive 27 should have a sufficient degree of tackiness to permit the cable spacer web 20 to self-adhere to cable 10 across splice area 14. A length of cable spacer web 20 is selected to be slightly greater than the length of the exposed area 14 of cable 10. Typically, the spacer web 20 should extend about 8 inches longer than the splice area 14 to provide a 4 inch overlap onto the cable insulation 13 on both sides of the splice area.

Referring now to FIG. 3, web 20 is wrapped around splice area 14 extending over the entire splice area and adhesively adhering to the insulation 13 of cable 10 adjacent splice area 14. Spacer web 20 should be wrapped fully circumferencely around splice area 14 at least once, with some overlap provided at the upper extent, 10. In practice plural wraps may be employed. While the adhesive coating 27 on web 20 will secure the web to splice area 14 and the cable insulation 13 next adjacent thereto, sealant strips 30, or other conventional securing means, may be employed to further secure spacer web 20 across splice area 14. In the present illustrative embodiment several wraps of sealant strips 30 are used over the cable insulation 13 adjacent splice area 14 to secure web 20 thereto.

Figure 4:
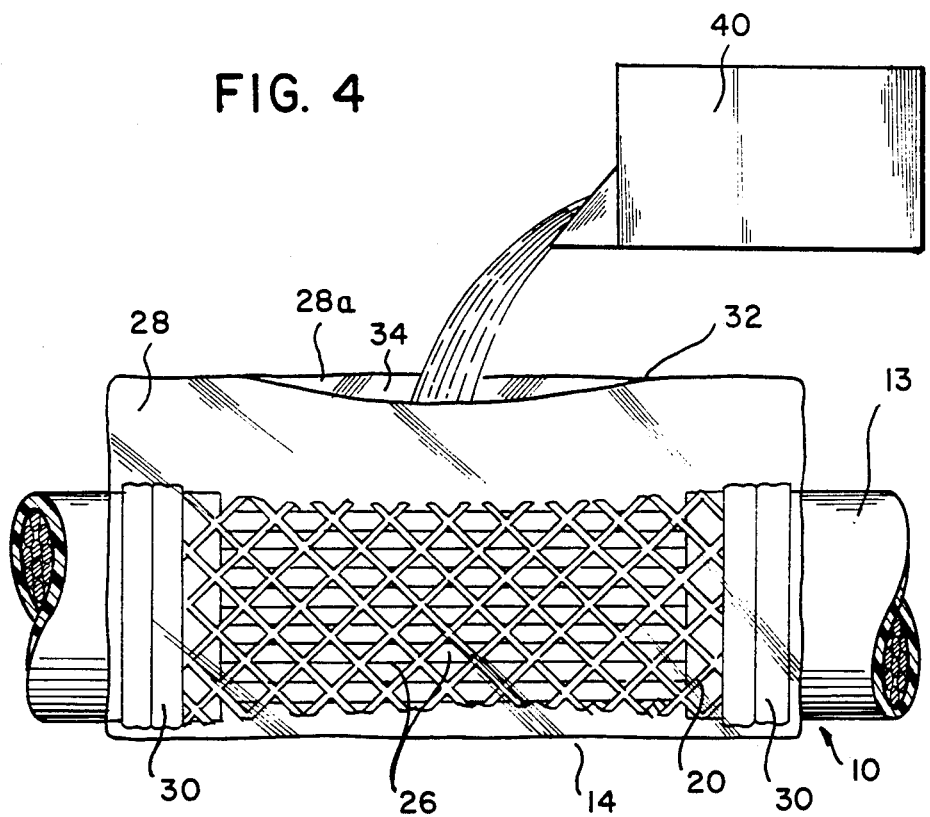
FIG. 4 shows cables of FIGS. 1 and 3 including an enclosure sheet placed there a round and showing the addition of cable encapsulent therein.

Referring further to FIG. 4, cable splice area 14 is surrounded by an extent of film 28. Film 28 is an adhesively coated length of flexible polypropylene having its adhesive side 28a covered by a release layer (not shown). Polypropylene is chosen as a preferred material as it is both flexible, transparent, puncture resistant and can be readily manipulated by the installer. However, any similar suitable material may also be employed. Film extent 28 is typically cut from a roll of such film (not shown) to have a length which is slightly greater than both the length of the splice area 14 and the web 20. Film extent 28 may also be supported in fixed lengths. Film extent 28 is folded approximately in half along and around the length of cable 10 to enclose the splice area 14. The adhesive surface 28a of film extent 28 is place facing cable 10. Film extent 28 thus forms a pouch or pocket 32 about the splice area 14. As as the adhesive surface 28a faces cable 10 it will adhere thereto. The folded portions of film extent 28 will extend past sealant strips 30 and will adhere both to the cable insulation 13 and to spacer web 20. An adhesive seal will be formed between pocket 32 and the cable insulation 13 adjacent splice area 14. In addition, the upwardly extending portions of the film surface 28a will adhere to its opposite folded side. A central portion of the folded film 28 is kept open between the sides thereof to form an access opening 34 to the splice area 14. Access opening area 34 is in communication with the splice area 14 to provide for receipt of encapsulating material therearound.

Having provided an access region to the exposed cable, encapsulant 40 may be poured into pocket 32 as shown in FIG. 4. Encapsulant 40 is typically a polyurethane compound which is provided in a semi-fluid state, so that it may be poured into pocket 32 to surround cable splice 14. Encapsulant 40 will typically cure in approximately one hour, to a gel-like consistency to prevent water penetration through the cable and into the splice area 14. The cured encapsulant 40 also protects the conductors of splice area 14 from physical abuse as result of direct burial. Open cell spacer web 20 having openings 26, facilitates the flow of the semifluid encapsulant 40 therearound. Further, the adhesive coating 28 acts as a wetting agent facilitating flow of the encapsulant 40 through web 20. As the liner 28 is held slightly spaced from splice area 14 by spacer web 20, the encapsulant 40 will flow completely around the splice area and cover all the conductors thereof. Once the encapsulant 40 fills pocket 32 and completely surrounds splice area 14, the pocket can be manually closed by bringing together the opposed adhesively coated sides 28a at access opening 34. Any excess air which may remain in the now closed pocket 32 can be removed by placing a small pinhole in the pocket and manually squeezing the air out. This small pinhole will either self-seal or can be sealed by a small length of sealing tape.

Figure 5:
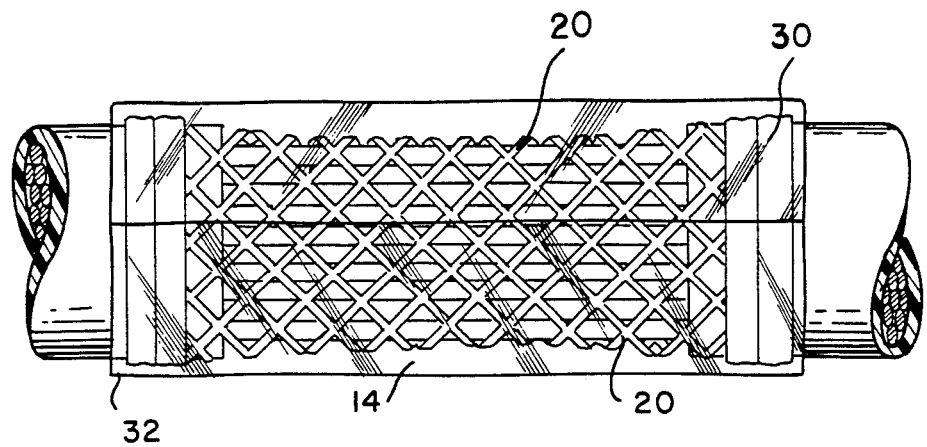
FIG. 5 shows the cable of FIG. 1 with the encapsulated splice area closed and sealed.

Turning now to FIG. 5, the upwardly extending edge of pocket 32 is folded down around cable 10 to form a filled tight package around splice area 14. As film extent 28 is formed of polypropylene or other suitably thin flexible material the extending edges can easily be wrapped around cable 10 and will not unecessarily add bulk to the enclosed cable splice.

Figure 6:
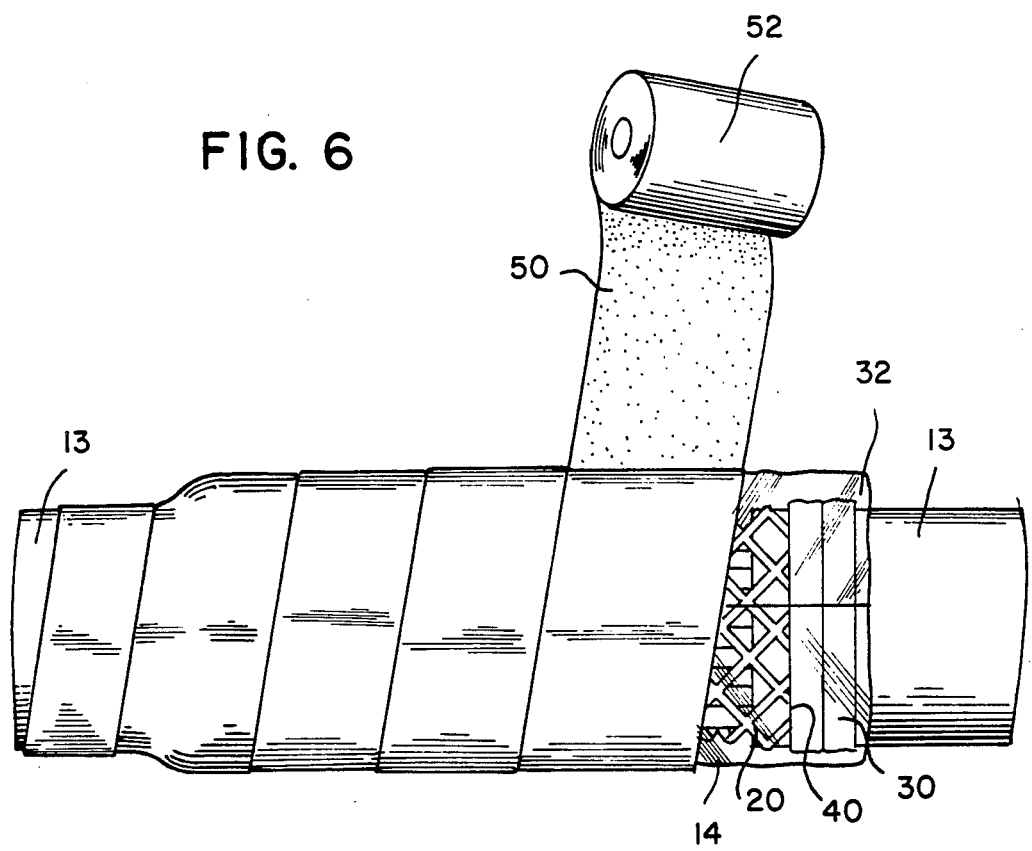
FIG. 6 shows the cable of FIG. 1 with the successive step of wrapping the enclosed splice area with sealing tape.

Having prepared the splice area 14 as above described, the cable may now be covered with a sealing tape 50 as shown in FIG. 6. Tape 50 is a sealing type double rubber tape having one cured side and one uncured side which is applied to the enclosed splice in conventional overlapping fashion. Tape 50 is provided in a roll 52 and is for example of the type commonly known as DR tape. The entire splice area, as well as side portions of cable jacket 13 adjacent splice area 14 are sealed with tape 50. The taped area may also extend further longitudinally beyond the spliced area 14 to insure adequate coverage. The tape applied in the manner shown will place a positive pressure to the enclosed splice area. This positive pressure will further prevent propagation of moisture through the cable core and into the splice area. After sealing with tape 50 the splice area may further be covered with an outer protective sleeve (not shown) such as the type shown and described in commonly assigned U.S. Pat. No. 4,358,634 issued Nov. 9, 1982. This type sleeve provides additional environmental and mechanical protection to the splice area.

Sealed in this manner cable 10 may now be reinserted in the ground or suspended outdoors. As the cured encapsulating material 40 fully surrounds the conductors of splice area 14, the splice area is sealed preventing moisture penetration and mechanically protected from environmental hazards.

Various other modifications to the foregoing disclosed embodiment will be evident to those skilled in the art. Thus the particularly described preferred embodiment is intended to be illustrative and not limited thereto. The true scope of the invention is set forth in the following claims.

I claim:

1. A method of sealing a splice area in an electrical cable comprising the steps of:
    (a) wrapping an open cell spacer web around said cable splice area;
    (b) separately wrapping an adhesively coated liner around said cable splice area and said web, to form an open pocket, said adhesive coating of said liner being placed against said spacer;
    (c) filling said pocket with cable encapsulating material; and
    (d) sealably wrapping said filled pocket.

2. A method in accordance with claim 1 wherein said wrapping step (a) comprises:
    adhesively securing said open cell spacer web to said cable splice.

3. A method in accordance with claim 1 including, prior to step (b), the step of:
    securing said web to said cable adjacent said splice area.

4. A method in accordance with claim 1 wherein said open cell spacer includes an adhesively coated surface and said wrapping (a) comprises:
    wrapping said adhesively coated surface around said cable splice area.

5. A method in accordance with claim 1 wherein said open cell spacer web is formed of flexible material.

6. A method in accordance with claim 5 wherein said open cell spacer web is ethylene vinyl acetate.

7. An apparatus for use in sealing a splice area of an electrical cable comprising:
    an elongate, flexible ethylene vinyl acetate spacer web for surrounding and extending beyond said splice area of said cable, said spacer web being plastic and having a substantially planar construction and defining a pair of opposed planar surfaces having a plurality of opening therebetween for passage of cable encapsulating fluid, said spacer web further including one planar surface thereof having an adhesive coating thereon for adhesive engagement with said cable adjacent said splice area.

8. An apparatus of claim 7 wherein said web is a substantially open member having a mesh-like appearance.

* * * * *